Figure 5:
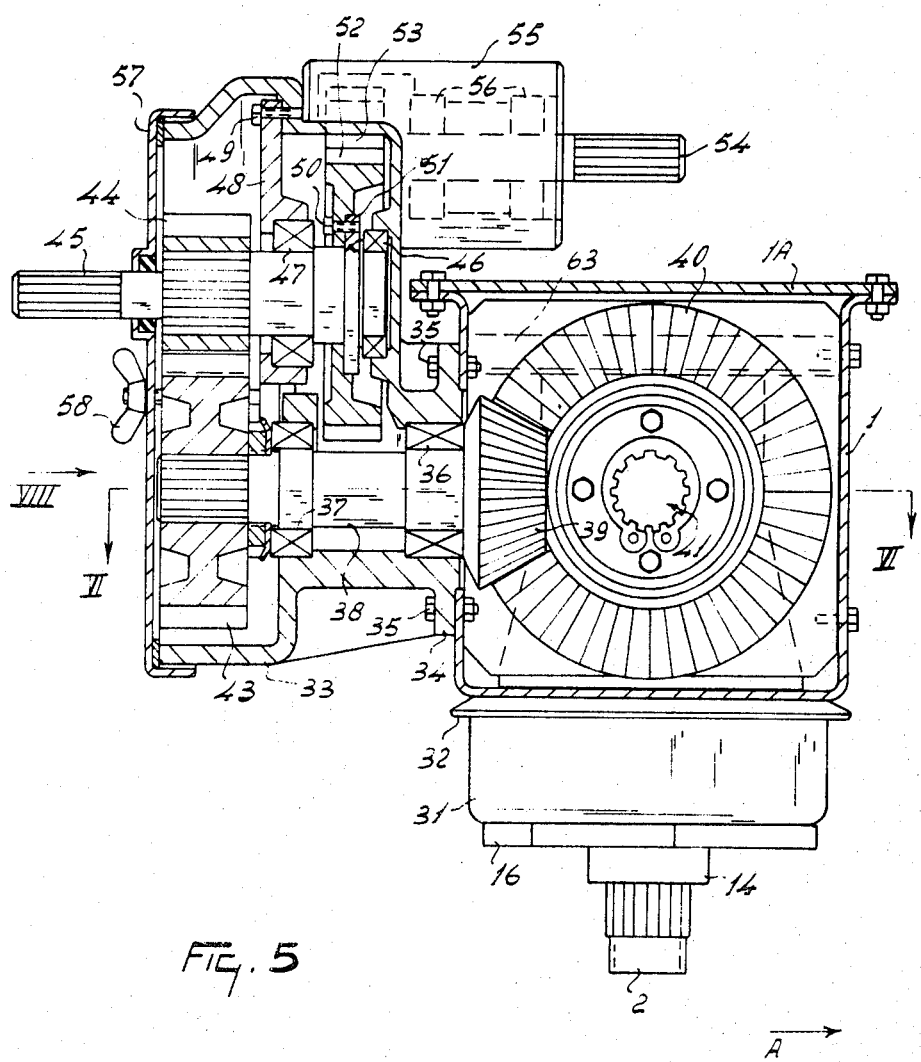

United States Patent [19]
van der Lely

[11] 4,224,998
[45] Sep. 30, 1980

[54] SOIL CULTIVATING IMPLEMENTS
[76] Inventor: Cornelis van der Lely, Zug, Switzerland
[21] Appl. No.: 859,849
[22] Filed: Dec. 12, 1977
[30] Foreign Application Priority Data
Dec. 13, 1976 [NL] Netherlands ................. 7613805
[51] Int. Cl.² ........................................... A01B 33/06
[52] U.S. Cl. .................................. 172/59; 172/96
[58] Field of Search ............... 172/59, 96, 707, 708, 172/111, 119, 522–526

[56] References Cited
U.S. PATENT DOCUMENTS

| 1,476,917 | 12/1923 | Patitz | 172/119 |
| 2,050,120 | 8/1936 | Pizarro | 172/490 |
| 2,214,702 | 9/1940 | Seaman | 172/96 |
| 2,490,237 | 12/1949 | Silver | 172/707 X |
| 2,559,048 | 7/1951 | Seaman | 172/96 X |
| 3,111,917 | 11/1963 | Dawrs | 172/111 X |
| 3,131,774 | 5/1964 | Lely | 172/707 X |
| 3,667,551 | 6/1972 | Lely | 172/59 |

FOREIGN PATENT DOCUMENTS

| 1381569 | 11/1964 | France | 172/59 |
| 618658 | 2/1949 | United Kingdom | 172/96 |

Primary Examiner—Richard J. Johnson

[57] ABSTRACT

A cultivating implement has a row of tined members that have resilient arms and a resilient tines with coil supports that can deflect to mitigate stone damage. The members are mounted on a frame portion that is turntable about an axis extending transverse to the direction of travel, against resilient opposition. Each member includes a hub with bearings protected by an opposing flange and plate structure. Drive to the members is transmitted by shafts housed in the hollow frame portion and the shafts are supported in bearings connected to support members connected to the walls of the frame portion.

18 Claims, 10 Drawing Figures

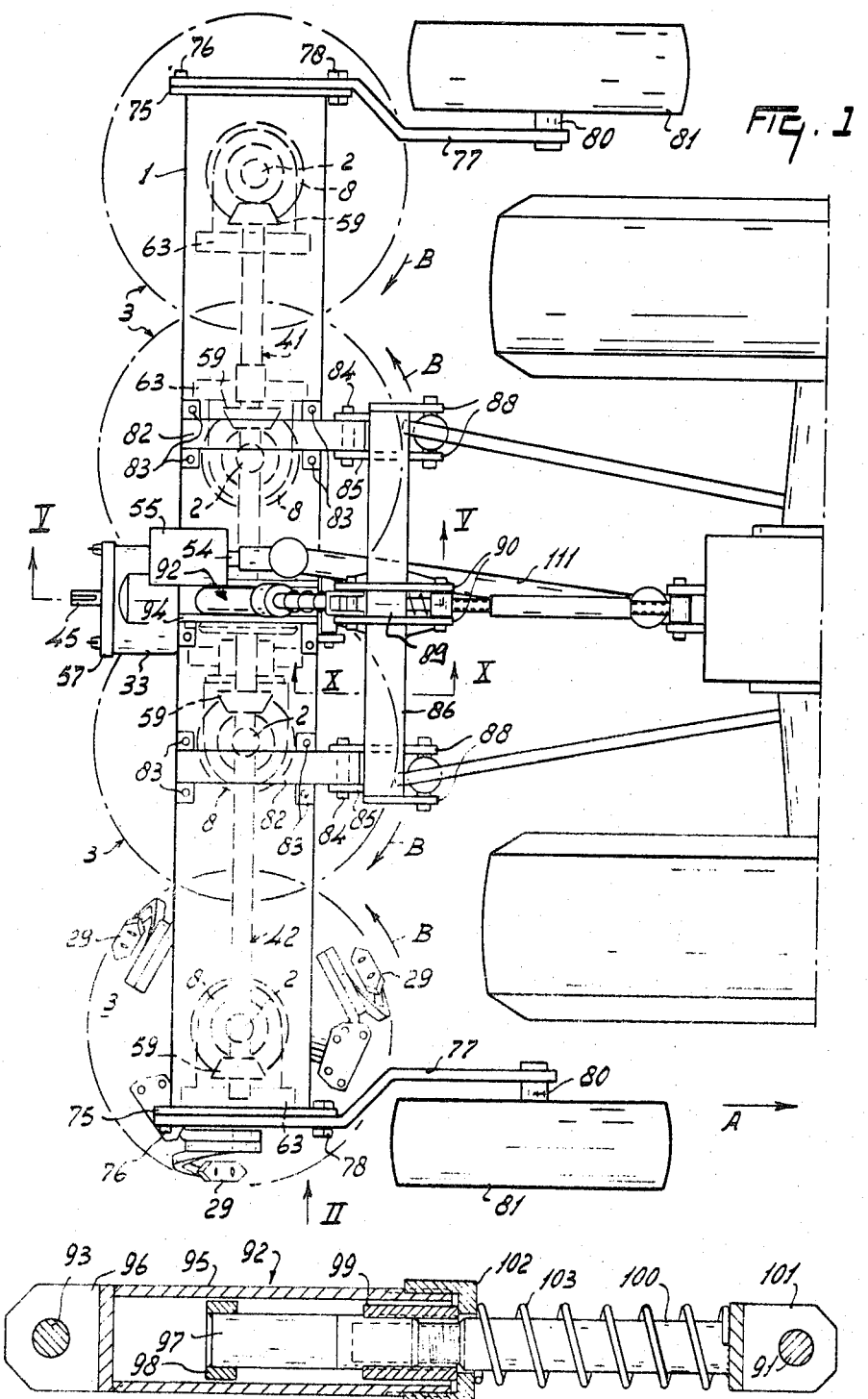

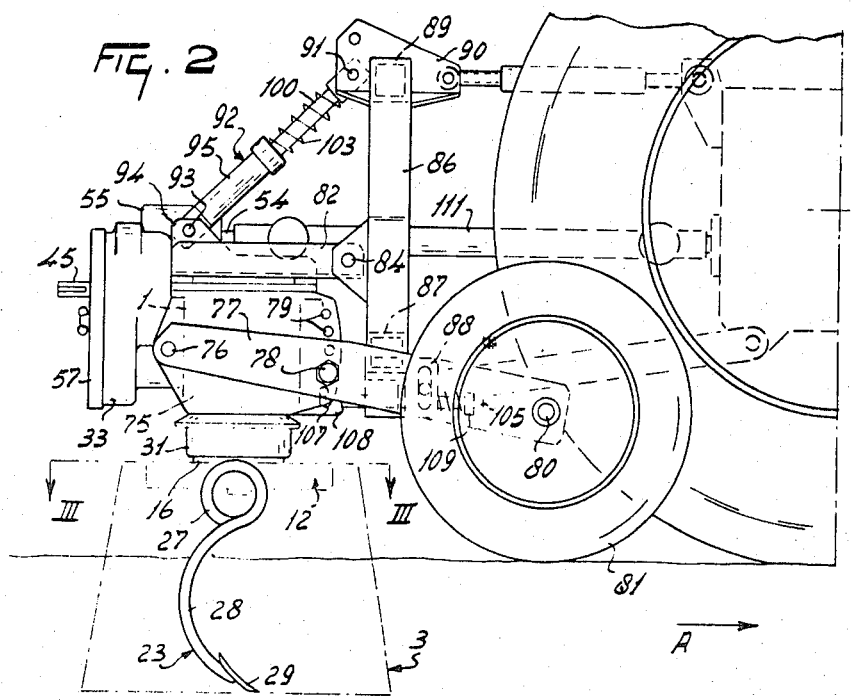
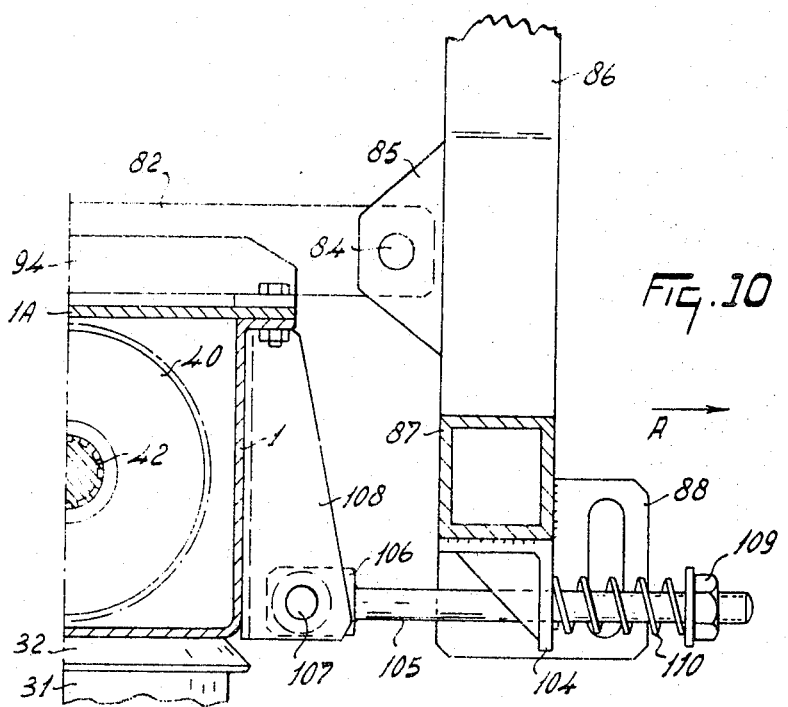

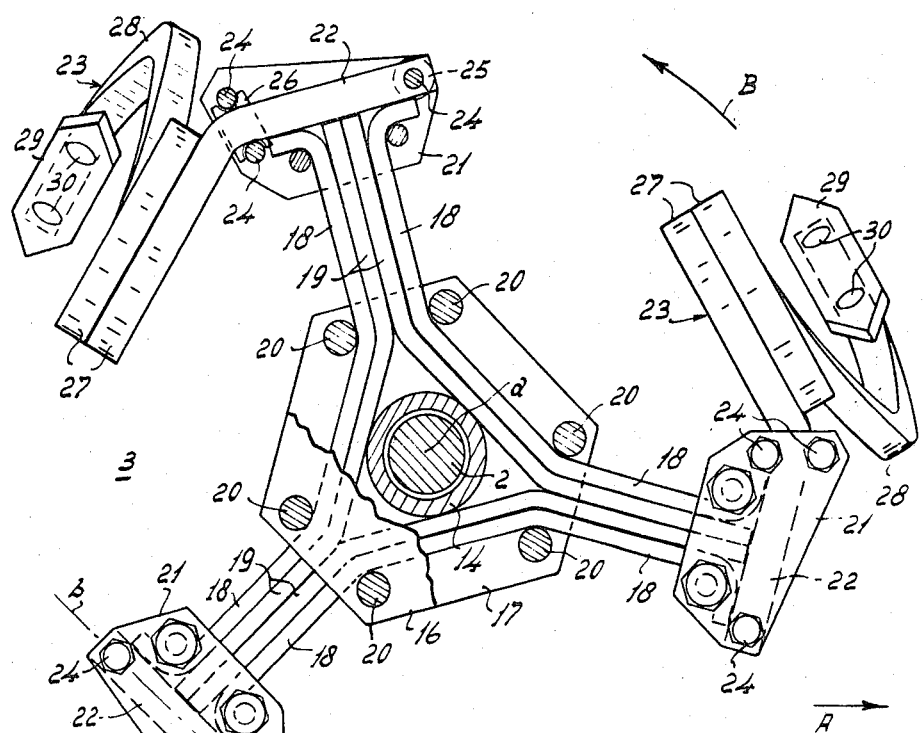
FIG. 3
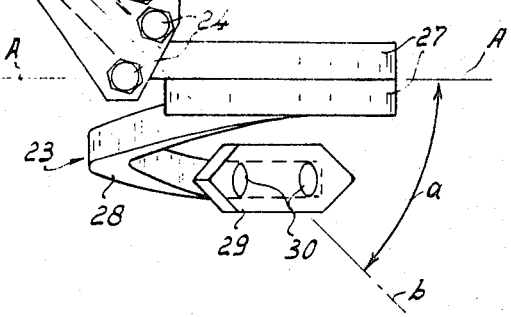
FIG. 4
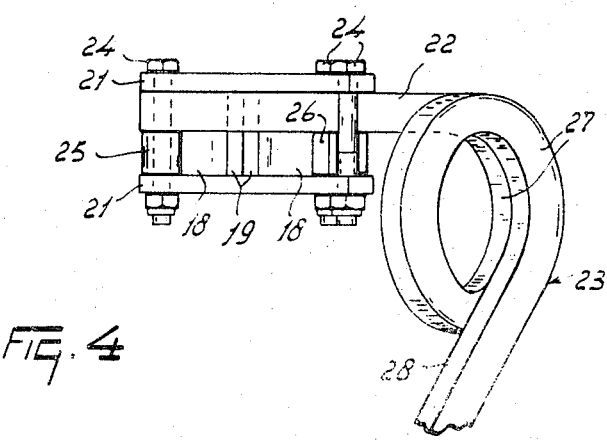

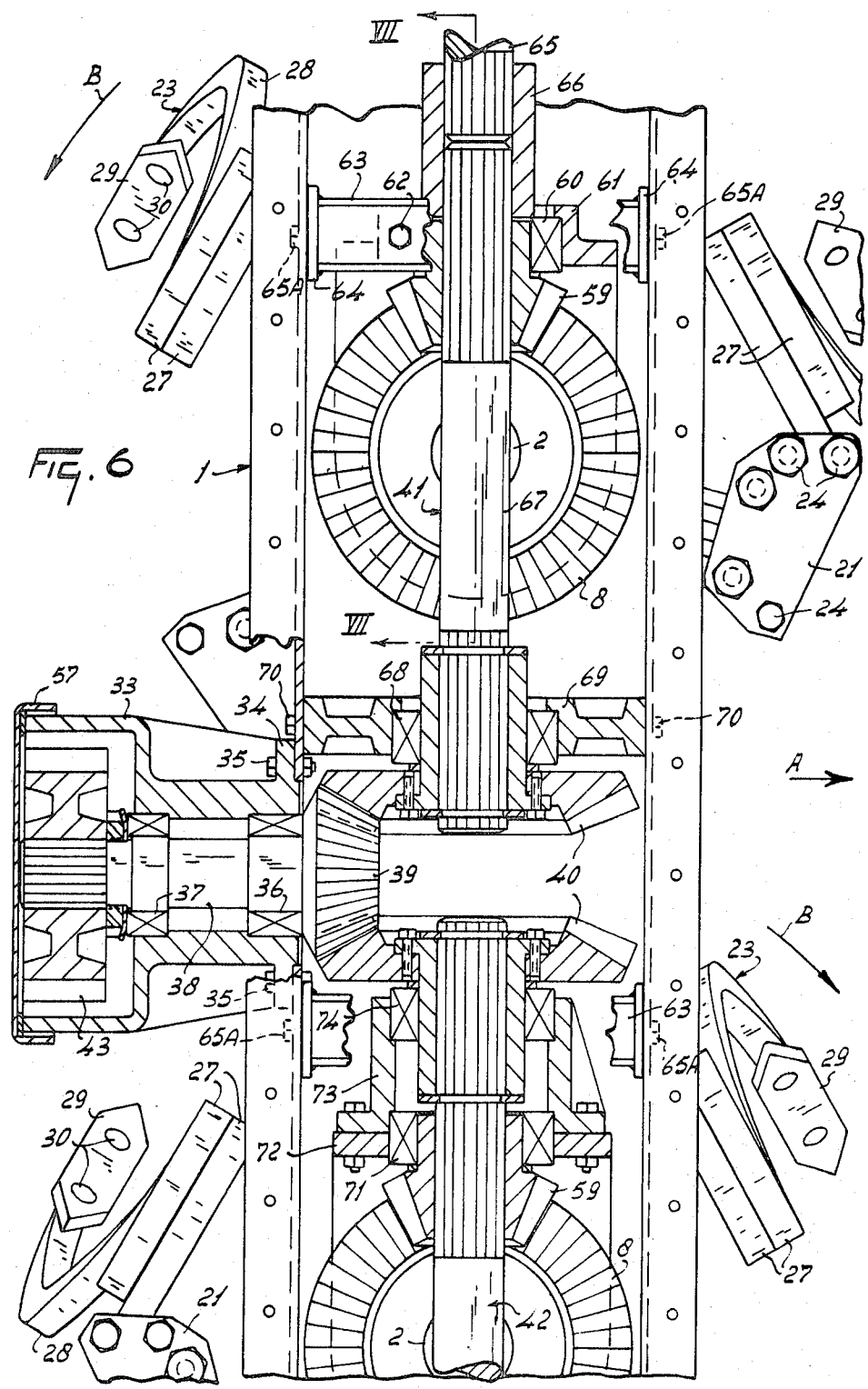

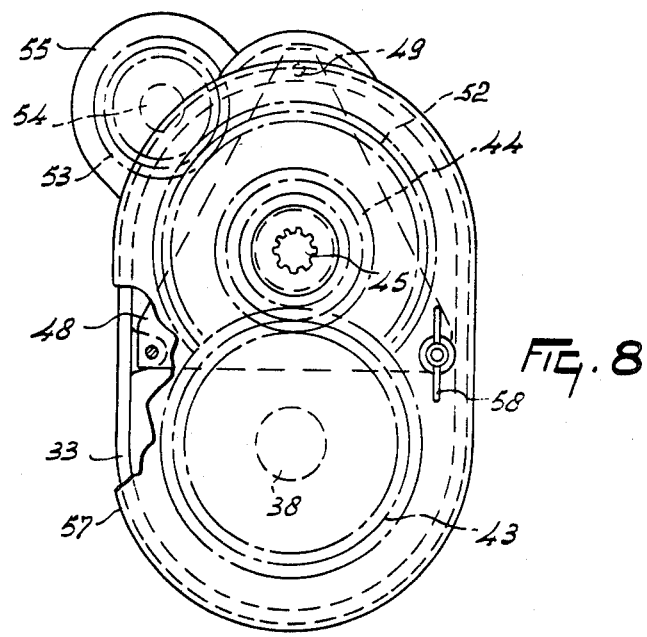
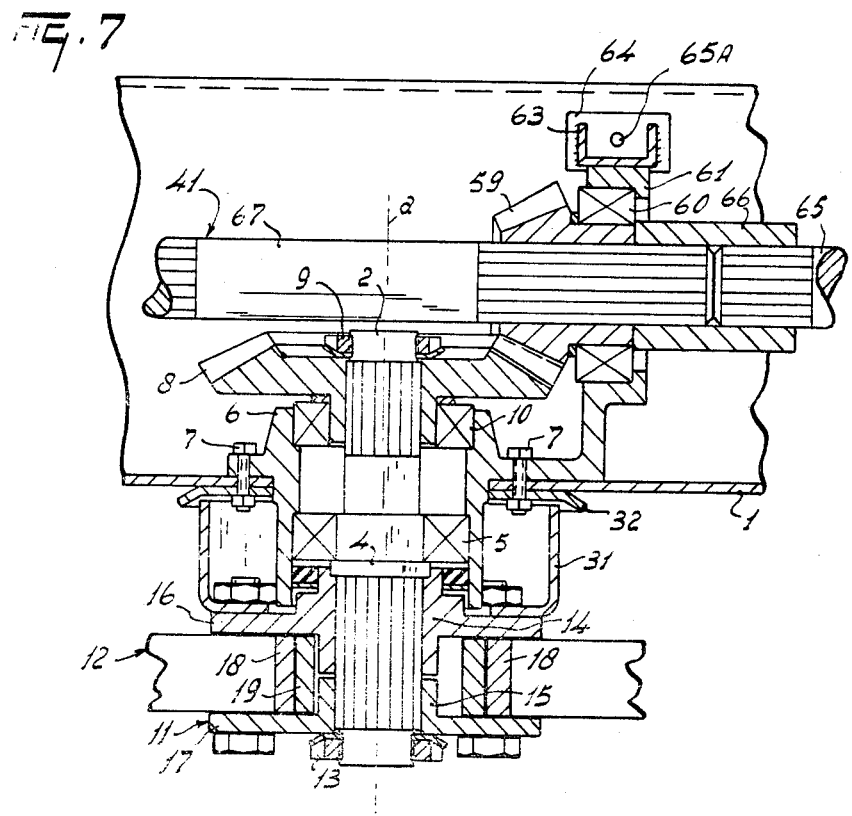

SOIL CULTIVATING IMPLEMENTS

This invention relates to soil cultivating implements or machines of the kind which comprise a plurality of resilient-tined soil working members that are rotatable about corresponding upwardly extending axes. The expression "implement(s)" will be shortened to "implement(s)" alone throughout the remainder of this specification for the sake of brevity.

According to one aspect of the invention, there is provided a soil cultivating implement of the kind set forth, wherein said tines are supported so as to be displaceable, against resilient opposition, relative to the axes of rotation of the corresponding soil working members and are provided with blades at substantially their lower ends.

For a better understanding of the invention, and to show how the same may be carried into effect, reference will now be made, by way of example, to the accompanying drawings, in which:

FIG. 1 is a plan view of a soil cultivating implement in accordance with the invention, in the form of a rotary harrow, connected to the rear of an agricultural tractor, FIG. 2 is a side elevation as seen in the direction indicated by an arrow II in FIG. 1, FIG. 3 is a section, to an enlarged scale, taken on the line III—III in FIG. 2, FIG. 4 is an elevation showing further details of the construction and arrangement of parts that can be seen in FIG. 3, FIG. 5 is a section, to an enlarged scale, taken on the line V—V in FIG. 1, FIG. 6 is a section taken on the line VI—VI in FIG. 5, FIG. 7 is a section taken on the line VII—VII in FIG. 6, FIG. 8 is an elevation as seen in the direction indicated by an arrow VIII in FIG. 5, FIG. 9 is a section, to an enlarged scale, showing details of the construction and arrangement of a resilient assembly whose position can be seen in FIGS. 1 and 2 of the drawings, and FIG. 10 is a section, to an enlarged scale, taken on the line X—X in FIG. 1.

Referring to the drawings, the soil cultivating implement that is illustrated therein is in the form of a rotary harrow and is constructed and arranged so as to be particularly suitable for the deep cultivation of soil rather than the treatment of substantially only an uppermost top soil layer. The harrow has a hollow box-section frame portion 1 that extends substantially horizontally transverse and usually (as illustrated) substantially horizontally perpendicular to the intended direction of operative travel of the harrow that is indicated by an arrow A in several of the Figures of the drawings. The top of the hollow frame portion 1 is closed by a removable cover plate 1A (FIGS. 5 and 10) that is maintained in its closing position by a plurality of small substantially vertically disposed bolts. A plurality (of which there are four in the example that is being described) of upwardly extending and usually vertically or substantially vertically disposed shafts 2 are rotatably mounted in the hollow frame portion 1 in a manner that will be further described below and lie in a single row with their axes of rotation (longitudinal axes) a (FIGS. 3 and 7) spaced apart from one another at regular intervals, which, as in the example that is being described, preferably have magnitudes of substantially 75 centimeters. Each shaft 2 projects downwardly beyond the bottom of the hollow frame portion 1, the downwardly projecting portion being provided with a corresponding rotary soil working member that is generally indicated by the reference 3 and that will be described in greater detail below. Substantially midway along the upright axial length of each shaft 2, that shaft is formed with a shoulder 4 (FIG. 7) of short axial length against the upper surface of which shoulder 4 abuts the inner race of a corresponding ball bearing 5, said race surrounding the shaft 2 concerned immediately above its shoulder 4. Each bearing 5 is arranged in a corresponding bearing housing 6 which housing is lodged in a circular hole in the flat bottom of the hollow frame portion 1, the housing 6 being maintained in its appointed position by a number of substantially vertically disposed bolts 7. An upper end region of each shaft 2 that lies inside the hollow frame portion 1 is splined and said splines co-operate with the matchingly splined hub of a corresponding bevel or crown pinion 8, the bevel or crown pinion 8 being prevented from becoming axially detached from the co-operating splined portion of the shaft 2 concerned by the provision of a nut 9 and an associated lock washer which parts are mounted on a short uppermost screwthreaded part of the shaft 2 that is under consideration. The external surface of the hub of each pinion 8 is surrounded by the inner race of a corresponding upper ball bearing 10, the outer race of said bearing 10 abutting against an internal shoulder at the upper end of the corresponding bearing housing 6 in such a way that the upper end of the bearing 10 projects by a short part of its axial length above the open upper end of that housing 6.

Each bearing housing 6 has a lower substantially cylindrical portion which projects downwardly through the corresponding hole in the bottom of the frame portion 1 to a level which is beneath that of the shoulder 4 of the shaft 2 which it coaxially surrounds. A space is thus left between the bottom of each lower ball bearing 5 and the lower mouth of the corresponding housing 6 which space receives, with the provision of a diagrammatically illustrated lubricant seal, the upper end of an upper portion 14 of a hub 11 that forms part of a carrier or support 12 of the corresponding rotary soil working member 3. Each hub 11 also comprises a lower portion 15 and the two portions 14 and 15 of each hub 11 are internally splined for co-operation with matching external splines on a portion of the corresponding shaft 2 that extends beneath the shoulder 4 thereof. It can be seen in FIG. 7 of the drawings that the upper end of the upper portion 14 of each hub 11 is shaped to embrace the lower end of the corresponding shoulder 4. The two portions 14 and 15 of each carrier or support hub 11 co-operate clampingly with other parts of that carrier or support and are therefore, as illustrated in FIG. 7 of the drawings, usually spaced apart from one another by a short distance axially along the lower splined portion of the corresponding shaft 2, axial disengagement of the whole hub 11 from that splined portion being prevented by the provision, on a short screwthreaded lowermost end of the shaft 2, of a nut 13 and an associated lock washer. The upper portion 14 of each hub 11 has a radially extending upper plate 16 and the lower portion 15 of the same hub 11 has a corresponding radially extending lower plate 17 that is of the same shape and size as the upper plate 16 but that is spaced axially therefrom along the respective shaft 2. The two plates 16 and 17 of each hub 11 are parallel to one another and perpendicular to the axis a of the corresponding shaft 2, said plates 16 and 17 being spaced by substantially equal distances from the lower end of the corresponding upper portion 14 and the upper end of the corresponding lower portion 15, respectively. As can be seen in FIG. 3 of the drawings, each of the plates 16 and 17 is of irregular hexagonal shape having alternate longer and shorter edges. The longer edges are all of the same length and the shorter edges are all of the same length, each longer edge being substantially one-and-a-half times the length of each shorter edge.

Three pairs of outer and inner spring steel strips 18 and 19 are retained between the lower surface of each plate 16 and the upper surface of the corresponding plate 17. The two strips 18 and 19 of each pair lie alongside each other and each strip is so disposed that, as seen in cross-section, the longer parallel edges of that section are in parallel or substantially parallel relationship with the axis of rotation of the corresponding shaft 2. The two strips 18 and 19 of each pair are angularly bent to form brackets, said strips thus having central rectilinear webs or bases from the opposite ends of which webs or bases project outwardly divergent rectilinear limbs. The webs or bases are integrally connected to the limbs by sharp bends that have angular magnitudes of substantially 150°. The web or base of each such bracket has a length which is substantially the same as that of one of the longer edges of one of the plates 16 or 17. The pairs of strips 18 and 19 are arranged around the cylindrical portions of the corresponding hub 11 in such a way that the webs or bases of the three inner strips 19 bear tangentially against the outer surfaces of those cylindrical portions while each pair of rectilinear limbs projects substantially radially outwardly with respect to the corresponding axis a in abutting engagement with a second pair of rectilinear limbs, it being the two inner limbs 19 concerned that actually make surface-to-surface contact with one another. The three groups that each comprise two limbs 18 and two limbs 19 thus project substantially radially with respect to the corresponding axis a at substantially 120° intervals around that axis, each group affording an arm that registers with one shorter edge of the corresponding plate 16 and one shorter edge of the corresponding plate 17 (see FIG. 3). The outer strip 18 of each interengaging pair is longer than is the companion strip 19, said outer strips 18 projecting beyond the inner strips 19 at both ends of each pair where they are bent over outwardly away from said strips 19 through substantially 90°. The arrangement is such that, as can be seen in FIG. 3 of the drawings, the radially outer surfaces of the bent-over ends of the strips 18 are flush with the unbent ends of the associated inner strips 19. The upper and lower surfaces of the strips 18 and 19 afford, at the end regions of those strips which have just been discussed, supporting surfaces for corresponding upper and lower clamping plates 21. (FIGS. 3 and 4). The three pairs of interengaging strips 18 and 19 of each carrier 12 are clamped in their appointed positions between the upper and lower portions 14 and 15 of the corresponding hub 11 by three pairs of bolts 20 that all extend parallel or substantially parallel to the corresponding axis a, it being apparent from FIG. 3 of the drawings that the shanks of the six bolts 20 of each carrier or support 12 abut against the outer surfaces of the corresponding three outer strips 18 at the angular bends between the webs or bases and the limbs of the brackets into which those strips are formed, as discussed above, by bending.

Each pair of upper and lower clamping plates 21 releasably secures a fastening portion 22 of a corresponding spring steel tine 23 in such a position that said fastening portion 22, which is straight, extends substantially tangentially with respect to an imaginary circle centered upon the axis a of the corresponding shaft 2. The spring steel from which each tine 23 is formed is of polygonal cross-section and preferably has either a square cross-section or the oblong cross-section that is illustrated in the drawings. The radially inner surface of each tine fastening portion 22 bears against the radially outer surfaces of the bent-over ends of the two corresponding strips 18 and the flush unbent outer ends of the two intervening inner strips 19. Each claming plate 21 has the irregular septagonal shape which can be seen in FIG. 3 of the drawings from which it will be apparent that each such plate 21 is broader in width towards the front thereof, with respect to the intended direction of operative rotation B of the corresponding soil working member 3, than it is towards the rear thereof. Three bolts 24 that extend parallel or substantially parallel to the corresponding axis a clamp the fastening portion 22 of each tine 23 against the lower surface of the respective upper clamping plate 21 (see FIG. 4). In order to positively to prevent detachment of the tines 23 from the soil working members 3, the rearmost bolt 24 of each group of three such bolts with respect to the direction B is entered through a hole that is formed in the fastening portion 22 concerned at a location close to the free end of that portion. A spacing sleeve 25 surrounds the shank of the "rear" bolt 24 of each group of three between the lower surface of the tine fastening portion 22 concerned and the upper surface of the respective lower clamping plate 21. Each tine fastening portion 22 passes, with a minimum (if any) of clearance between the shanks of the two leading bolts 24 of each group of three bolts, with respect to the direction B, and a spacing block 26 whose shape can be seen in FIGS. 3 and 4 of the drawings is interposed between the lower surface of each tine fastening portion 22, between the corresponding two "leading" bolts 24, and the upper surface of the underlying lower clamping plate 21. The clamping sleeves 25 and clamping blocks 26 have a thickness in a direction that is parallel to each axis a which is the same as the top-to-bottom measurement of each of the strips 18 and 19 in that direction.

The foremost edges of the clamping plates 21 with respect to the direction B extend substantially radially with respect to the corresponding axis a and it will be seen from FIG. 3 of the drawings that the fastening portions 22 of the tines 23 project forwardly from between the pairs of upper and lower clamping plates 21 at locations which register with said leading edges. A bend integrally connects the leading end of each fastening portion 22 (with respect to the direction B) to a resilient support of the corresponding tine 23 which resilient support comprises a helical coil 27 having substantially one-and-a-half complete turns around its own longitudinal axis (see FIG. 4). The end of each helical coil 27 which is remote from the corresponding fastening portion 22 is integrally connected to the upper end of a soil working portion 28 of the tine 23 concerned, it being apparent from FIG. 2, in particular, of the drawings that each soil working tine portion 28 is of substantially regularly curved C-shaped configuration, said portion 28 being so disposed that its upper end projects downwardly and rearwardly from the corresponding coil 27 with respect to the intended direction of operative rotation B of the corresponding soil working member 3 while its lower end extends downwardly and forwardly relative to that direction B. Said lower end has a blade 29 firmly but releasably secured to it by a pair of bolts 30 which have countersunk heads. Each blade 29 is of curved configuration as seen in side elevation and has chisel-shaped points at both its opposite ends so that, after temporarily removing the bolts 30, each blade 29 can be reversed in position thus allowing the original leading chisel-shaped point that has become blunted due to wear to be replaced by the formerly trailing point that will have been worn to a much lesser extent, if at all. The lower end of each soil working tine portion 28 that carrier the corresponding blade 29 is so disposed that a tangent to the surface thereof which actually contacts said blade 29 is inclined to the horizontal at an angle of not less than 40°.

It can be seen in FIG. 3 of the drawings that a plane A—A which is perpendicular to the longitudinal axis of each coil 27 is disposed substantially tangentially with respect to an imaginary circular cylindrical surface whose longitudinal axis coincides with the corresponding axis a. A plane b—b which contains the longitudinal axis of the corresponding fastening portion 22 and that is in parallel relationship with the respective axis a is inclined to said plane A—A at angle α which preferably has a magnitude of not less than 30° and not more than 45°. The shape of each downwardly extending soil working tine portion 28 is such that, as viewed in a direction parallel to the corresponding axis a (i.e. as seen in FIG. 3 of the drawings), a plane (not indicated in the drawings) which contains the points at the opposite ends of the respective blade 29, and that is parallel to the respective axis a, is in parallel or substantially parallel relationship with the neighbouring plane A—A and is spaced from that plane in a direction that is radially away from the corresponding axis a.

FIGS. 3 and 4 of the drawings also make it clear that each coil 27 is in advance, with respect to the intended direction of operative rotation B of the corresponding soil working member 3, of the integrally associated tine fastening portion 22. The circular paths that are traced by the blades 29 of the soil working members 3 are a little greater in diameter than is the spacing between the axes a so that the strips of soil that are worked by the individual members 3 overlap one another (see FIG. 1), the harrow thus, in effect, working a single broad strip of soil. A drive transmission, that will hereinafter be described, to the soil working members is arranged so that the tines 23 of neighbouring members 3 do not foul one another, during operation, in the regions of overlap.

The six bolts 20 of each soil working member carrier or support 12 also secure to the top surface of the corresponding upper plate 16 an inwardly directed rim or flange of a cylindrical screen or hood 31 (FIG. 7) whose longitudinal axis is coincident with the corresponding axis a and whose upper edge is located inside and beneath, with a minimum of clearance, the upwardly tapering frusto-conical outer rim of an annular plate 32 which is secured to the lower surface of the bottom of the frame portion 1, in surrounding relationship with the respective bearing housing 6, by the same bolts 7 that fasten said bearing housing 6 to the frame portion 1. The inwardly directed rim or flange at the lower end of each cylindrical screen or hood 31 is located close to, and is in surrounding relationship with, the lowermost edge of the associated bearing housing 6.

A gear box 33 is mounted at the back of the hollow frame portion 1, with respect to the direction A, at a location midway between the center pair of the four shafts 2 when the harrow is viewed from the rear in the direction A. The gear box 33 has a forwardly directed portion that registers with a hole in the rear wall of the frame portion 1, said forwardly directed portion being formed with a flange 34 (FIGS. 5 and 6) which is firmly but releasably fastened to said rear wall of the hollow frame portion 1 by a number of substantially horizontally disposed bolts 35. A shaft 38 extends substantially horizontally parallel to the direction A in the portion of the gear box 33 that is secured to the hollow frame portion 1, said shaft 38 being rotatably mounted in the gear box by horizontally spaced apart leading and rear roller or ball bearings 36 and 37. The leading end of the shaft 38 with respect to the direction A projects through the hole in the back of the hollow frame portion 1 into the interior of that frame portion where it is provided with a bevel pinion 39 whose teeth are drivingly in mesh with those of two opposed, and larger, bevel pinions 40 (see FIG. 6). The bevel pinions 40 are fastened by bolts to the flanges of internally splined hubs which hubs are fitted on matchingly splined end portions of axially aligned, but axially spaced, shafts 41 and 42. The two aligned shafts 41 and 42 extend substantially horizontally parallel to the transverse length of the hollow frame portion 1 in the interior of that frame portion and are so positioned that their coincident longitudinal axes also substantially coincide with the longitudinal axis of the frame portion 1 itself. The rear end of the shaft 38, with respect to the direction A, that is located inside the gear box 33 is splined and co-operates with the matchingly splined hub of a straight-toothed or spur-toothed pinion 43 which pinion 43 has its teeth in driven mesh with those of a smaller straight-toothed or spur-toothed pinion 44 (FIG. 5). The pinion 44 is mounted on a splined portion of a shaft 45 which is located above the shaft 38 in substantially horizontally parallel, but spaced, relationship therewith. The shaft 45 is rotatably mounted in the gear box 33 by horizontally spaced apart leading and substantially central ball or roller bearings 46 and 47, respectively. The leading bearing 46 is supported by a bearing housing that is formed integrally in a front wall of the gear box 33 while the substantially central bearing 47 is supported by a housing that forms part of a substantially triangular plate 48 (see FIG. 8). The plate 48 is fastened in its appointed position in the gear box 33 by substantially horizontally disposed bolts 49 that are arranged near its three corners to co-operate with anchorages located at substantially the top and substantially half way down the opposite sides of the gear box 33.

The shaft 45 in the gear box 33 has a flange 51 at a location close to the leading bearing 46 and a straight-toothed or spur-toothed pinion 52 is secured to said flange 51 by substantially horizontally disposed bolts 50. The pinion 52 has its teeth in driven mesh with those of a smaller straight-toothed or spur-toothed pinion 53 that is fast in rotation with a shaft 54 that extends substantially horizontally parallel to the shafts 38 and 45, and to the direction A, inside a casing 55 which defines a space at the top and to one side of the gear box 33 (see FIGS. 5 and 8). The shaft 54 is rotatably supported in the casing 55 by ball or roller bearings 56 that are spaced apart from one another along said shaft in the direction A, the leading end of the shaft 54 with respect to that direction being arranged to project forwardly through a front wall of the casing 55 where it is splined to enable it to serve as a rotary input shaft for the drive transmission of the harrow by being placed in driven connection with the rear power take-off shaft of an agricultural tractor or other operating vehicle through the intermediary of a telescopic transmission shaft 111 (FIGS. 1 and 2), which is of a kind that is known per se, having universal joints at its opposite ends. The pinion 52 has twice the effective diameter of the pinion 53 and said pinions 52 and 53 thus afford a speed-reducing step-down transmission by which, during operation, the shaft 45 is driven at half the number of revolutions per unit time of the shaft 54. The back of the gear box 33 with respect to the direction A has a readily releasable cover 57 that is retained in its closing position by a pair of wing nuts 58. Access to the interior of the gear box 33 is thus quickly and easily obtained, the two pinions 43 and 44 being interchangeable in position on the splined portions of the co-operating shafts 38 and 45 and said pinions preferably also being exchangeable for at least one other pair of co-operating pinions (not shown) that are of different sizes to the pinions 43 and 44. The rear part of the gear box 33 that is closed by the cover 57 thus affords a change-speed gear so that the rotary soil working members 3 can be driven at any chosen one of a number of different speeds in response to a substantially constant speed of driving rotation that is applied to the leading end of the shaft 54 from the rear power take-off shaft of an agricultural tractor or other operating vehicle, through the intermediary of the telescopic transmission shaft 111, when the harrow is in use. It will be noted that the shaft is extended rearwardly through an opening, provided with a rotary seal, in the cover 57, the part of said shaft 45 that projects from behind the cover 57 being splined so that it can be used as a source of rotary power for the moving parts of some other implement, machine or tool that may be used in combination, or conjunction, with the rotary harrow that is being described.

The drive transmission to the rotary soil working members 3 is such that, during operation, each member 3 revolves in the direction B (FIGS. 1 and 3) which direction is opposite to the direction of rotation of its immediate neighbour, or both of its immediate neighbours, in the row of four members 3. Thus, the two members 3 which are at one side of an imaginary vertical plane of substantial symmetry of the harrow which extends parallel to the direction A rotate in opposite directions as do the other two members 3 which are located at the opposite side of said imaginary plane. The drive transmission which has just been mentioned includes the axially aligned shafts 41 and 42 and the corresponding bevel pinions 40, it being noted that said shafts 41 and 42, with the corresponding pinions 40, are also located at opposite sides of the imaginary vertical plane of substantial symmetry of the harrow that has just been referred to. Splined portions of the two shafts 41 and 42 carry corresponding bevel pinions 59 (FIGS. 6 and 7) and those pinions 59 are in driving mesh with the bevel or crown pinions 8 which are mounted at the upper ends of the two shafts 2 which correspond to the two central rotary soil working members 3 of the row of four such members. Two further bevel pinions 59 (FIG. 1) are located at substantially the end of the shaft 42 which is remote from the midpoint of the frame portion 1 and at the end of an outer portion 65 (FIGS. 6 and 7) of the shaft 41 which outer portion 65 is separate from, but extends in axial prolongation of, an inner portion 67 of the same shaft 41. The adjoining ends of the two portions 65 and 67 of the shaft 41 are splined and are maintained fast in rotation with one another by an internally splined sleeve 66 which surrounds said ends. The shaft 41 is to the left of the aforementioned vertical plane of substantial symmetry of the rotary harrow which extends in the direction A when said harrow is viewed from the rear in that direction, the shaft 42 being located to the right of that plane under these circumstances. The two pinions 59 which are at the remote ends of the shafts 41 and 42 have internally splined hubs which co-operate with splines on the outer shaft portion 65 and the shaft 42, respectively and it will be seen from FIGS. 1, 6 and 7 of the drawings that the hubs of the three pinions 59 which are located on the shaft portions 65 and 67 and at the outer end of the shaft 42 co-operate with corresponding ball or roller bearings 60, the outer races of said bearings 60 being accommodated in respective bearing housings 61 and said housings 61 being integral with the bearing housings 6 for the three neighbouring soil working members 3 (see particularly FIG. 7). However, the top of each bearing housing 61 is also secured by bolts 62 (FIG. 6) to the web or base of a corresponding support 63 of U-shaped or channel-shaped cross-section that extends transverse to the length of the hollow frame portion 1 and thus parallel or substantially parallel to the direction A. The opposite ends of each support 63 are welded or otherwise rigidly secured to plates 64 and those plates 64, in turn, are releasably secured to the front and rear walls of the hollow frame portion 1 by bolts 65A.

It will have been realised from what has been described above and will be evident from FIGS. 1 and 6 of the drawings that the shafts 41 and 42 are not identical and that the arrangement of the corresponding two pinions 59 on each of those shafts is different due to the particular directions B in which the four soil working members 3 have to be rotated when the rotary harrow is in use. As mentioned above, the hub of each of the two bevel pinions 40 is releasably secured by bolts to the flange of a corresponding internally splined sleeve which sleeve co-operates with external splines at the inner end of the shaft 41 or 42 concerned, said sleeves being maintained in their appointed positions axially along their respective shafts by circlips whose arragements can be seen in FIGS. 5 and 6 of the drawings. The outer surface of the splined sleeve which is mounted on the inner portion 67 of the shaft 41 is surrounded by the inner race of a ball or roller bearing 68, the outer race of that bearing being lodged in a shouldered housing which forms part of a support 69 that is secured between the upright front and rear walls of the frame portion 1, in perpendicular relationship with those walls, by bolts 70. The outer surface of the internally splined hub of the bevel pinion 59 is nearest to the inner end of the integral shaft 42 (see the lower half of FIG. 6 of the drawings (is surrounded by the inner race of a ball or roller bearing 71, the outer race of that bearing 71 being accommodated partly in an opening in an upright plate 72 that is integral with the bearing housing 6 for the rotary bearings 5 and 10 of the neighbouring shaft 2 and partly in an internally shouldered housing member 73 that is bolted to the plate 72 and by further bolts 62 (not visible) to the web or base of a further one of the supports 63 that in substantially identical in construction and mounting to the supports 63 that have been described above.

The opposite ends of the hollow frame portion 1 are closed by substantially vertical side plates 75 that are in parallel or substantially parallel relationship with each other and with the direction A. It will be seen from FIGS. 1 and 2 of the drawings that the side plates 75 project both in front of and behind the upright front and rear walls of the hollow frame portion 1 and that the rearwardly projecting portions of the two plates carry corresponding pivots 75 that are substantially horizontally aligned in a direction which is transverse, and usually (as illustrated) substantially perpendicular, to the direction A. An arm 77 is turnable upwardly and downwardly about each pivot 76 alongside each plate 75, said arms 77 extending generally forwardly with respect to the direction A from their pivots 76. The forwardly projecting portion of each side plate 75 is formed with a curved row of holes 79 which holes are equidistant from the axis that is defined by the aligned pivots 76. Each arm 77 is formed with a hole at the same distance from said axis and bolts 78 are provided for entry through the holes in the arms 77 and chosen ones of the corresponding rows of holes 79 so that, when said bolts 78 have been installed and tightened, the arms 77 are reliably but releasably retained in corresponding angular settings about the axis that is defined by the pivots 76. It can be seen from FIG. 1 of the drawings that each arm 77 is offset inwardly towards the aforementioned imaginary vertical plane of substantial symmetry of the harrow at a location immediately in front of the leading edge of the corresponding side plate 75, the obliquely inwardly offset portions of the arms 77 terminating at their leading ends in further portions which are parallel to the portions thereof that lie alongside the plates 75. These leading portions of the arms 77 are provided, at their foremost ends, with substantially horizontal axle shafts 80 which are located at the relatively remote outer sides of the two arms 77. Each axle shaft 80 has a corresponding pneumatically tyred ground wheel 81 mounted thereon in a freely rotatable manner. The two arms 77 will almost always be set in corresponding angular positions about the axis that is defined by the pivots 76 and it will be appreciated that, under these circumstances, the axes of rotation of the two ground wheels 81 that are defined by their axle shafts 80 will be coincident or substantailly coincident.

Two supports 82 are secured to the top of the hollow frame portion 1 by bolts 83, which may conveniently be some of the bolts which maintain the top cover plate 1A in position, said supports 82 being located at equal distances from the aforementioned imaginary vertical plane of substantial symmetry of the harrow which extends parallel to the direction A. The two supports 82 both extend substantially horizontally parallel to the direction A and their leading ends project forwardly in that direction beyond the upright front wall of the hollow frame portion 1. Substantially horizontally aligned pivot pins 84 connect the spaced limbs of corresponding brackets 85 (FIGS. 1 and 10) to the forwardly projecting portions of the two supports 82, said limbs of each bracket 85 lying at the opposite sides of the corresponding supports 82. The two substantially horizontally aligned pivot pins 84 define an axis which is parallel or substantially parallel to the transverse length of the hollow frame portion 1 and thus substantially perpendicular, or at least transverse, to the direction A. Each bracket 85 is connected to a corresponding upwardly extending beam 86 and is so positioned that the pivot pins 84 are at a level which is substantially, although not necessarily exactly, midway between the levels of the uppermost and lowermost ends of said beams 86. The lower ends of the two beams 85 are rigidly interconnected by a beam 87 of hollow formation and square cross-section that extends parallel to the axis which is defined by the pivot pins 84. The lowermost end of each beam 86 and adjacent portions of the beam 87 are provided with a pair of horizontally spaced apart and forwardly projecting lugs 88 which lugs are formed with substantially vertically extending slots that are intended to co-operate with substantially horizontal pivot pins in coupling the lugs to the free ends of the lower lifting links of a three-point lifting device hitch of an agricultural tractor or other operating vehicle in the manner that is shown somewhat diagrammatically in FIGS. 1 and 2 of the drawings. The upper ends of the beams 86 are interconnected by a substantially horizontal beam 89 of hollow formation and square cross-section that extends parallel to the beam 87 and parallel or substantially parallel to the hollow frame portion 1. The upper substantially horizontally disposed transverse beam 89 is provided, midway along its transverse length, with a pair of substantially vertically disposed plates 90 that are spaced apart from one another by a short distance along the beam 89 but which are parallel to one another and parallel or substantially parallel to the direction A. Leading portions of the two plates 90 with respect to the direction A are arranged for interconnection by a horizontal pivot which can be coupled, as shown somewhat diagrammatically in FIGS. 1 and 2 of the drawings, to the rear end of the upper adjustable length lifting link of a three-point lifting device or hitch at the rear of an agricultural tractor or other operating vehicle.

Rear end regions of the two plates 90, with respect to the direction A, are interconnected by a substantially horizontal pivot pin 91 about which one end of a resilient assembly, that is generally indicated by the reference 92, is turnable between the two plates 90. The resilient assembly 92 which is shown in detail in FIG. 9 of the drawings comprises a cylinder or tube 95 having the end thereof that is remote from the pivot pin 91 closed by the web or base of a fork 96 whose limbs are pivotally connected by a substantially horizontal pin 93 to a pair of elongate lugs 94 that are secured to the hollow frame portion 1 immediately above its top cover plate 1A (see FIGS. 1, 2 and 10). The pivot pin 93 is, in fact, located near the back of the hollow frame portion 1 in substantial register with the upright rear wall of that frame portion. The cylinder or tube 95 of the resilient assembly 92 telescopically contains a substantially axially disposed shaft portion 97 which carries, at the end thereof that is nearest to the fork 96, an annular slider member 98 that is arranged to co-operate with the internal surface of the cylinder or tube 95. The end of the shaft portion 97 that is remote from the slider member 98 is formed with an axially extending blind bore and is screwthreaded both on its external surface and internally of said bore. The external screwthread co-operates with an internal screwthread on a surrounding sleeve 99 that is of the same external diameter as the slider member 98 whilst the screwthread in the blind bore co-operates with a matchingly screwthreaded end portion of a rod or shaft portion 100 that projects from the tube 95 in axial extension of the shaft portion 97. The end of the rod or shaft portion 100 which is remote from the shaft portion 97 is fixedly secured to the web or base of a fork 101, the limbs of said fork 101 being connected to the pivot pin 91 to establish the pivotal coupling to the plates 90 that are carried by the beam 89. The end of the cylinder or tube 95 that is remote from the fork 96 has an external screwthread which co-operates with the internal screwthread of a cap 102, said cap 102 having a central hole through which is entered the rod or shaft portion 100. It will be seen from FIG. 9 of the drawings that the sleeve 99 is of larger diameter than the central hole in the cap 102 thus preventing the distance between the pivot pins 91 and 93 becoming greater than is shown in FIG. 9. A helical compression spring 103, which is installed in an already compressed condition, surrounds the rod or shaft portion 100 between the web or base of the fork 101 and the cap 102 and thus tends to maintain the resilient assembly 92 in the fully extended state that is illustrated in FIG. 9. However, it will be realised that the internally screwthreaded sleeve 99 is axially adjustable along the externally screwthreaded end of the shaft portion 97 so that the fully extended length of the assembly 92 can be increased, or decreased, as may be required.

A downwardly projecting lug 104 is secured to the transverse beam 87 at a location midway along the length of the latter and a rod 105 (FIG. 10) is entered forwardly through a hole in said lug, the rearmost end of the rod 105 being rigidly secured to the web or base of a fork 106. The fork 106 is received between a pair of large forwardly projecting lugs 108 that are fastened to the front wall of the hollow frame portion 1 in horizontally spaced apart and substantially vertically disposed parallel relationship. A substantially horizontal pivot shaft 107 co-operates with at least one bearing sleeve in connecting the limbs of the fork 106 turnably to the lugs 108. The rod 105 projects forwardly with respect to the direction A beyond the lug 104 and its leading end is screwthreaded. The screwthread receives a nut 109 and a co-operating washer and a helical compression spring 110 surrounds the rod 105 between the washer and the forwardly facing surface of the lug 104.

In the use of the rotary harrow that has been described, a coupling member thereof that is afforded principally by the beams 86, 87 and 89 is connected to the free ends of the upper and lower lifting links of a three-point lifting device or hitch at the rear of an agricultural tractor or other operating vehicle in the manner which is illustrated somewhat diagrammatically in FIGS. 1 and 2 of the drawings. The forwardly projecting leading end of the shaft 54 is placed in driven connection with the rear power take-off shaft of the same tractor or other operating vehicle through the intermediary of the aforementioned known telescopic transmission shaft 111 that has universal joints at its opposite ends. Adjustments that may, if required, be made before work commences include setting the maximum depth to which the tines 23 of the rotary soil working members 3 can penetrate into the ground by raising or lowering the level of the axis of rotation of the ground wheels 81 relative to that of the hollow frame portion 1 by turning the arms 77 upwardly or downwardly, as may be required, about the pivots 76, utilising the bolts 78 reliably to maintain any newly adopted setting. In addition, the speed at which the members 3 will revolve in response to a substantially constant input speed of rotation that is applied to the shaft 54 can be increased, or decreased, as may be required by removing the cover 57 and interchanging the pinions 43 and 44 or by substituting an alternative pair of pinions, of different sizes, therefor. These adjustments will usually be made having regard to the nature and condition of the soil that is to be cultivated and the particular purpose for which that soil is required after treatment. As the rotary harrow moves forwardly in the direction A over the ground that is to be cultivated, the drive transmission between the shaft 54 and the shafts 2 causes the rotary soil working members 3 to revolve in the directions B that are indicated in FIG. 1 of the drawings which direction are such that the two members 3 which are at one side of the imaginary vertical plane of substantial symmetry of the harrow that extends parallel to the direction A will revolve in opposite directions as will the other two members 3 that are at the opposite side of said plane. Moreover, the two members 3 that are in adjoining relationship with said plane revolve in opposite directions during operation. The bladed tines 23 that are made from spring steel of square, oblong or other polygonal cross-section are particularly suitable for use in the deep cultivation of soil. If the soil working portion 28 of any tine 23 meets a firmly embedded obstacle, such as a rock, that portion can readily deflect in a resilient manner relative to the axis of rotation a of the member 3 of which it forms a part due to the resilience of the corresponding coil 27, the resilient formation of the respective carrier 12 and to the resilience of the material from which it is, itself, formed. Damage to the tines 23 due to, for example, collisions with firmly embedded obstacles, is thus almost always avoided or is very greatly reduced. The soil working portion 28 of each tine 23 can deflect about the axis of the corresponding coil 27, that axis being in radial or substantially radial relationship with the axis of rotation a of the corresponding soil working member 3. If significant deflection of the supporting strips 18 and 19 of the respective carrier 12 also takes place, a plane which is perpendicular to the axis of the coil 27 concerned will still be in substantially tangential relationship with a circular cylindrical figure centered upon the corresponding axis a. The resilient construction and mounting of the tines 23 not only avoids or greatly reduces damage to those tines but also has an advantageous effect upon the pulverisation or crumbling of the soil which the rotary harrow produces, particularly when the harrow is working with wet and/or heavy soil.

In addition to avoiding or greatly reducing damage to the tines 23 during the deep cultivation of soil by the resilient construction and mounting of those tines as has been discussed above, avoidance of damage is still further facilitated due to the fact that the hollow frame portion 1, which carries the soil working members 3, can turn upwardly and downwardly with respect to the coupling member that is afforded principally by the parts 86, 87 and 89 about an axis that extends substantially horizontally perpendicular to the direction A, said axis being defined by the aligned pivot pins 84. Upward deflection of the frame portion 1 and soil working members 3 about the axis that is defined by the pivot pins 84 is, of course, opposed by the springs 103 and 110. This upward pivotability of the frame portion 1, against resilient opposition, is particularly important in protecting the tines 23 from damage when working in soil that contains a considerable proportion of stones, some of which may be quite large. Moreover, the upward and downward pivotability of the frame portion 1 and soil working members 3 can, under some circumstances, enhance the cultivating action of the members 3. The restoring effect of the springs 103 and 110 may be increased or decreased, as may be desired, by adjusting the positions of the sleeve 99 and the nut 109, respectively. The axis of pivotability of the frame portion 1 that is defined by the pivot pins 84 is located immediately in advance, with respct to the direction A, of said frame portion 1 at a level which is just above that of the top cover plate 1A of said frame portion and this disposition of the axis is such that only a very small angular displacement of the frame portion 1 thereabout will be sufficient to disengage the resilient tines 23 from potentially damaging rocks, stones and so on.

When the rotary harrow is in use, the rotary input shaft 54 of the casing 55 will usually be driven at a speed of substantially 1000 revolutions per minute. The step-down transmission which comprises the pinions 52 and 53 reduces this applied speed of rotation by half so that the shaft 45 is rotated at a speed of substantially 500 revolutions per minute. For most deep cultivation purposes, the change-speed gear that has been discussed above, and to which access is obtained by removing the cover 57, is arranged so that the shafts 2, and thus the soil working members 3, will be revolved at speeds of substantially 40 revolutions per minute, it being remembered that the various pinions which are contained with in the frame portion 1 also reduce the speed of rotation of the shafts 2 as compared with the speed of rotation of the output shaft 38 of the gear box 33. The way in which the shafts 41 and 42 are sustained from locations that are near to the upright walls of the frame portion 1 by the supports 63 greatly facilitates effective resistance of the drive transmission to the opposition of the soil to displacement, particularly when, as will usually be the case, the tines 23 are penetrating into the soil to a considerable depth. The rotary bearings 5 and 10 of the shafts 2 are protected to a very large extent from becoming contamined by soil by the co-operation of the cylindrical screens or hoods 31 with the annular plates 32 (see FIG. 7). As previously mentioned, the rotary harrow that has been described by way of example has a working width of substantially 3 meters but it will be appreciated that this width is by no means mandatory and that the harrow could be modified so as to have a reduced or increased working width.

Although various features of the rotary harrow that has been described and/or that is illustrated in the drawings will be set forth in the following claims as inventive features, it is emphasised that the invention is not necessarily limited to those features and that it includes within its scope each of the parts of the rotary harrow that has been described, and/or that is illustrated in the accompanying drawings, both individually and in various combinations.

What we claim is:

1. A soil cultivating implement comprising a frame and a row of soil working members rotatably mounted on said frame, said members being rotatable about upwardly extending axes defined by respective shafts and driving means connected to rotate said members, each member including support means on a respective shaft and tines depending downwardly from said support means, each tine having a lower soil working portion and an upper fastening portion, said soil working portion being interconnected to said support means through a resilient coil and said coil being located in advance of said fastening portion relative to the normal direction of rotation of the corresponding soil working member, a plane perpendicular to the longitudinal axis of said coil being substantially tangential with an imaginary circular cylinder, the longitudinal axis of which coincides with the axis of rotation of said soil working member, said fastening portion being substantially straight and extending substantially tangential to an imaginary circle centered on the axis of rotation of said soil working member.

2. An implement as claimed in claim 1, wherein said fastening portion is non-perpendicularly inclined to the plane that is perpendicular to the longitudinal axis of said coil.

3. An implement as claimed in claim 2, wherein the longitudinal axis of said fastening portion is contained in a plane that is substantially perpendicular to its axis of rotation, said fastening portion also being substantially perpendicular to an outwardly extending arm of said support means of the corresponding soil working member.

4. An implement as claimed in claim 3, wherein said support means comprises three resilient arms that are spaced apart from one another by angles of substantially 120° around said axis of rotation.

5. An implement as claimed in claim 4, wherein said support means comprises a plurality of resilient strips arranged in interengaging relationship of the strips, as seen in crosssection, being substantially parallel to the axis of rotation of the corresponding soil working member.

6. An implement as claimed in claim 5, wherein said support means comprises a plurality of interengaging pairs of said strips and each pair is angularly bent at two locations to form a bracket having a base and two limbs.

7. An implement as claimed in claim 6, wherein both the base and the limbs of said bracket are substantially straight.

8. An implement as claimed in claim 7, wherein the bases of the brackets and their limbs are substantially equal in length and the limbs of the brackets are in successive engagement with one another, the bases of said brackets being in contact with a central hub of the support means.

9. An implement as claimed in claim 8, wherein said pairs of interengaging strips are arranged beteen plates that are fastened to the hub.

10. An implement as claimed in claim 9, wherein said hub comprises separate upper and lower portions that co-operate with splines on a lower end region of said shaft, each of said plates being carried by a corresponding portion of said hub.

11. An implement as claimed in claim 1, wherein said shafts have rotary bearings with protective screening, each protective screening comprising a hood at the top of the support means and a co-operating downwardly inclined rim of an adjacent annular plate.

12. An implement as claimed in claim 1, wherein the soil working members are supported on an elongated hollow frame portion and the interior of said frame portion houses parts of a drive transmission to said members, comprising two relatively inclined shafts that are rotatably mounted in the frame portion, said shafts being mounted on rotary bearings carried by two bearing housings that are formed integrally from a single piece of material.

13. An implement as claimed in claim 12, wherein one of said shafts is a driving shaft that extends substantially parallel to the length of said frame portion and is connected to the shaft that defines the axis of rotation of said soil working member via toothed pinions.

14. An implement as claimed in claim 12, wherein said bearing housings are supported adjacent the top and bottom of said frame portion, the bottom of said frame portion having a hole through which said shaft axis extends.

15. A soil cultivating implement comprising a frame and a row of soil working members rotatably mounted on said frame, said members being rotatable about upwardly extending axes defined by respective shafts and driving means connected to rotate said members, each member including support means on a respective shaft and tines depending downwardly from said support means, each tine having a lower soil working portion and an upper fastening portion, said soil working portion being interconnected to said support means through a resilient coil and said coil being located in advance of said fastening portion relative to the normal direction of rotation of the corresponding soil working member, a plane perpendicular to the longitudinal axis of said coil being substantially tangential with an imaginary circular cylinder, that has a longitudinal axis coinciding with the axis of rotation of said soil working member, the lower end of said soil working portion being located adjacent said corresponding coil and generally parallel to that coil, at least part of said lower end being spaced from the axis of rotation of said soil working member further than said coil, said fastening portion being substantially straight and extending substantially tangential to an imaginary circle centered on the axis of rotation of said soil working member.

16. An implement as claimed in claim 15, wherein said soil working portion is substantially C-shaped when viewed from the side, said portion initially extending downwardly and rearwardly relative to its normal direction of rotation, from a junction with the coil, the lower end of said portion being orientated forwardly, said soil working portion extending substantially tangential to said imaginary cylinder.

17. An implement as claimed in claim 15, wherein a lower end of said soil working portion is located adjacent the outer side of said coil and substantially parallel to said coil, said lower end mounting a blade and releaseable fastening means securing the blade to said end.

18. A soil cultivating implement comprising a frame and a row of soil working members rotatably mounted on said frame, said members being rotatable about upwardly extending axes defined by respective shafts and driving means connected to rotate said members, each of said members comprising resilient arms extending outwardly from a central hub and a resilient tine having a fastening portion interconnected to a respective arm, said tine including a downwardly extending soil working portion that is integral with said fastening portion through a helical coil, said coil having a longitudinal axis that extends at an angle to said fastening portion, said arm terminating adjacent said fastening portion and being secured to abut that portion by clamping means.

* * * * *